United States Patent
Imai et al.

(10) Patent No.: US 7,345,395 B2
(45) Date of Patent: Mar. 18, 2008

(54) MOTOR STATOR CORE WITH SKEWED SLOTS AND PRODUCTION PROCESS THEREFOR

(75) Inventors: Nobuyuki Imai, Saitama (JP);
Tadanobu Takahashi, Saitama (JP);
Shigeru Tajima, Saitama (JP);
Masahiro Seki, Saitama (JP); Hiroyuki Kikuchi, Saitama (JP); Shin Aoki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 11/054,606

(22) Filed: Feb. 10, 2005

(65) Prior Publication Data
US 2005/0189843 A1 Sep. 1, 2005

(30) Foreign Application Priority Data
Feb. 12, 2004 (JP) ............................. 2004-034982
Sep. 28, 2004 (JP) ............................. 2004-280984

(51) Int. Cl.
*H02K 1/18* (2006.01)
*H02K 3/04* (2006.01)
*H02K 3/12* (2006.01)

(52) U.S. Cl. .................. 310/207; 310/216; 310/257

(58) Field of Classification Search ............... 310/207, 310/216, 43, 44, 180, 51, 257; 29/596
See application file for complete search history.

(56) References Cited

U.S. PATENT DOCUMENTS 3,531,672 A * 9/1970 King ..................... 310/180

6,441,530 B1 * 8/2002 Petersen ................ 310/216
2005/0189843 A1 * 9/2005 Imai et al. ............. 310/257

FOREIGN PATENT DOCUMENTS

| JP | 60-184431 A | | 9/1985 |
|---|---|---|---|
| JP | 03-003622 A | | 1/1991 |
| JP | 4-72461 | | 11/1992 |
| JP | 10-112963 | * | 4/1998 |
| JP | 2765764 | | 4/1998 |
| JP | 2002-136003 | * | 5/2002 |
| JP | 2002-136003 A | | 5/2002 |
| JP | 2002-066667 A | | 6/2002 |
| JP | 2003-088021 A | | 3/2003 |
| JP | 2003-235183 A | | 8/2003 |

* cited by examiner

*Primary Examiner*—Karl Tamai
(74) *Attorney, Agent, or Firm*—Arent Fox LLP

(57) ABSTRACT

In a motor stator, teeth radially project from an annular stator core, and a plurality of slots formed between adjacent teeth are skewed. Phase windings alternately pass through slots having different skew directions, wherein the length of bridging portions, which do not contribute to generation of torque, is short and the length of the portions which are located in the slots, and which contribute to the generation of torque, is long. Further, the phase windings are bent at an obtuse angle at opposite ends of the bridging portions.

11 Claims, 12 Drawing Sheets

MOTOR STATOR CORE WITH SKEWED SLOTS AND PRODUCTION PROCESS THEREFOR

RELATED APPLICATION DATA

Japanese priority application Nos. 2004-34982 and 2004-280984, upon which the present application is based, are hereby incorporated in their entirety herein by reference.

BACKGROUND OF THE INVENTION

1. Field of the Invention

The present invention relates to a motor stator wherein teeth radially project from a plurality of positions spaced in the peripheral direction of an annular stator core, and wherein a winding is wave-wound around the teeth.

2. Description of the Related Art

In a motor having a stator in which windings having a plurality of phases are wound around slots formed between teeth, short pitch winding and distributed winding are used to suppress the generation of torque ripple or abnormal torque harmonics due to the slots and to obtain smooth rotation. See Japanese Patent Application Laid-open No. 4-721461 and Japanese Patent No. 2765764.

However, when short pitch winding or distributed winding is used, as shown in FIG. 12A, in a winding 04 wound around slots 03 between teeth 02 of a stator 01, bridging portions 04a, which do not contribute to the generation of torque, become long, leading to problems. For example, the winding resistance increases, which results in a deterioration of efficiency. Also, when opposite ends of the bridging portion 04a are bent through 90°, an axial projection height H of the stator 01 increases, which makes it very difficult to reduce dimensions.

When wave winding, as shown in FIG. 12B, is used, the length of the bridging portions 04a of the winding 04 is shortened, wherein the winding resistance is decreased and there is an enhancement or improvement in efficiency. Also, the axial projection height H of the bridging portions 04a is reduced, which results in a reduction of dimensions. However, since torque ripple or abnormal torque harmonics, due to the slots 03, occurs by wave-winding the winding 04, the slots 03 must be inclined or skewed, as shown in FIG. 12C.

That is, as shown in FIG. 11, a force F that an unskewed length L of a conductor receives is represented by:

$$F = I \cdot B \cdot L \cdot \sin \omega t$$

where $I \cdot \sin \omega t$ denotes a current and B denotes a magnetic flux density.

On the other hand, a force dF that an infinitesimal portion dL of the conductor having a skew angle θ receives is represented by:

$$dF = I \cdot B \cdot \sin \{\omega t + (\cos \theta / L) \cdot x\} \cdot \cos \theta.$$

Consequently, a force Fsk received by the entire conductor is represented by:

$$Fsk = \int_{-\frac{L}{2\cos\theta}}^{\frac{L}{2\cos\theta}} I \cdot B \cdot \sin\left(\omega t + \frac{\cos\theta}{L} x\right) \cdot \cos\theta dx \quad \text{(Equation 1)}$$

$$= \int_{\omega t - \frac{\gamma}{2}}^{\omega t + \frac{\gamma}{2}} I \cdot B \cdot \sin\tilde{x} \cdot \frac{\cos\theta}{L} \cdot \cos\theta d\tilde{x}$$

-continued $$\tilde{x} = \omega t + \frac{\cos\theta}{L} x$$

$$= I \cdot B \cdot \frac{L}{\gamma} [-\cos\tilde{x}]_{\omega t - \frac{\gamma}{2}}^{\omega t + \frac{\gamma}{2}}$$

$$= I \cdot B \cdot \frac{L}{\gamma} \cdot 2\sin\omega t \cdot \sin\frac{\gamma}{2}$$

and a skew factor ksk=Fsk/F is represented by:

$$ksk = \frac{Fsk}{F} \quad \text{(Equation 2)}$$

$$= \frac{I \cdot B \cdot \frac{L}{\gamma} \cdot 2 \sin\omega t \cdot \sin\frac{\gamma}{2}}{I \cdot B \cdot L \cdot \sin\omega t}$$

$$= \frac{\sin\frac{\gamma}{2}}{\frac{\gamma}{2}}$$

Furthermore, a skew factor ksq for harmonics of order q is represented by:

$$ksq = \frac{\sin q \frac{\gamma}{2}}{q \frac{\gamma}{2}} \quad \text{(Equation 3)}$$

As is clear from Equation 2 and Equation 3, the greater the skew angle θ (the greater the γ), the smaller the skew factors ksk and ksq. In other words, as in the case where the above-mentioned short pitch winding or distributed winding is used, torque fluctuation of the motor may be suppressed concurrently with the reduction of motor torque.

As shown in FIG. 12C, although torque fluctuation of the motor is suppressable by skewing the wave-wound winding 04, the length of the bridging portions 04a cannot be shortened compared with the unskewed winding 04 shown in FIG. 12B. Instead, the winding 04 bends sharply in certain regions a to increase the projection height H of the bridging portions 04a, resulting in the axial dimensions of the stator 01 increasing.

SUMMARY OF THE INVENTION

The present invention has been accomplished with the above-mentioned circumstances in mind, and it is an aspect thereof to downsize a stator and prevent deterioration of torque by shortening bridging portions of a winding while suppressing torque fluctuation by skewing slots of the stator.

In order to attain this aspect, the present invention provides a motor stator in which teeth radially project from a plurality of positions spaced in the peripheral or circumferential direction of an annular stator core. A winding is wave-wound around the teeth, wherein a plurality of slots formed between adjacent teeth are skewed alternately in opposite directions. The winding alternately passes through slots having different skew directions so that the length of a bridging portion is short.

Accordingly, since the teeth radially project from the plurality of positions spaced in the peripheral or circumferential direction of the annular stator core, and the plurality of slots are formed between the teeth and skewed, the fluctuation of torque is suppressed, which permits the motor to rotate smoothly. Further, since the winding alternately passes through slots having different skew directions, the reduction in torque due to the skewing of the slots is compensated for by decreasing the length of the bridging portions of the winding, which makes no contribution to the generation of torque, and increasing the length of portions within the slots which contribute to the generation of torque. Furthermore, since the winding is bent at an obtuse angle at opposite ends of the bridging portions, not only does the winding operation for the winding become easy, but the height to which the bridging portions project from the stator core is decreased to reduce the axial dimensions of the stator.

Further, the stator core and the teeth can be formed from laminated steel plates. Accordingly, the skew direction of the slots can alternate by changing the shape of each steel plate.

Additionally, the stator core and the teeth can be formed from a compacted powder.

Since the stator core and the teeth are formed from a compacted powder, the number of components is reduced. Moreover, the number of components can be reduced while increasing the lamination factor of the winding and eliminating the need for insulating paper by rounding the edges at opposite ends of the slots which are in contact with the winding.

In a first step of the production process, an intermediate steel plate product is formed by pressing a steel plate material using a press die to obtain a first cutout group that is formed at equal intervals in the circumferential direction and from cutouts for half the number of the plurality of slots. In a second step of the process, a final steel plate product is formed by pressing the intermediate steel plate product using the same press die while changing the phase between the press die and the intermediate steel plate product according to the axial position of the final steel plate product in the stator to obtain a second cutout group formed at equal intervals in the circumferential direction and from cutouts for half the number of the plurality of slots in addition to the first cutout group. Therefore, it is possible to produce a large variety of steel plates having different phases between the first cutout group and the second cutout group using a single type of press die, thereby reducing the time and cost required for producing the steel plates.

In the second step of the above-described production process, the phase between the press die and the intermediate steel plate product is controlled according to a program determined on the basis of the shape of the stator.

Therefore, it is possible to efficiently form a large number of final steel plate products having different phases between the first cutout group and the second cutout group.

The above-mentioned aspect, other aspects, characteristics, and advantages of the present invention will become apparent from an explanation of the preferred embodiments that will be described in detail below by reference to the attached drawings.

DESCRIPTION OF THE PREFERRED EMBODIMENTS

Figure 1:
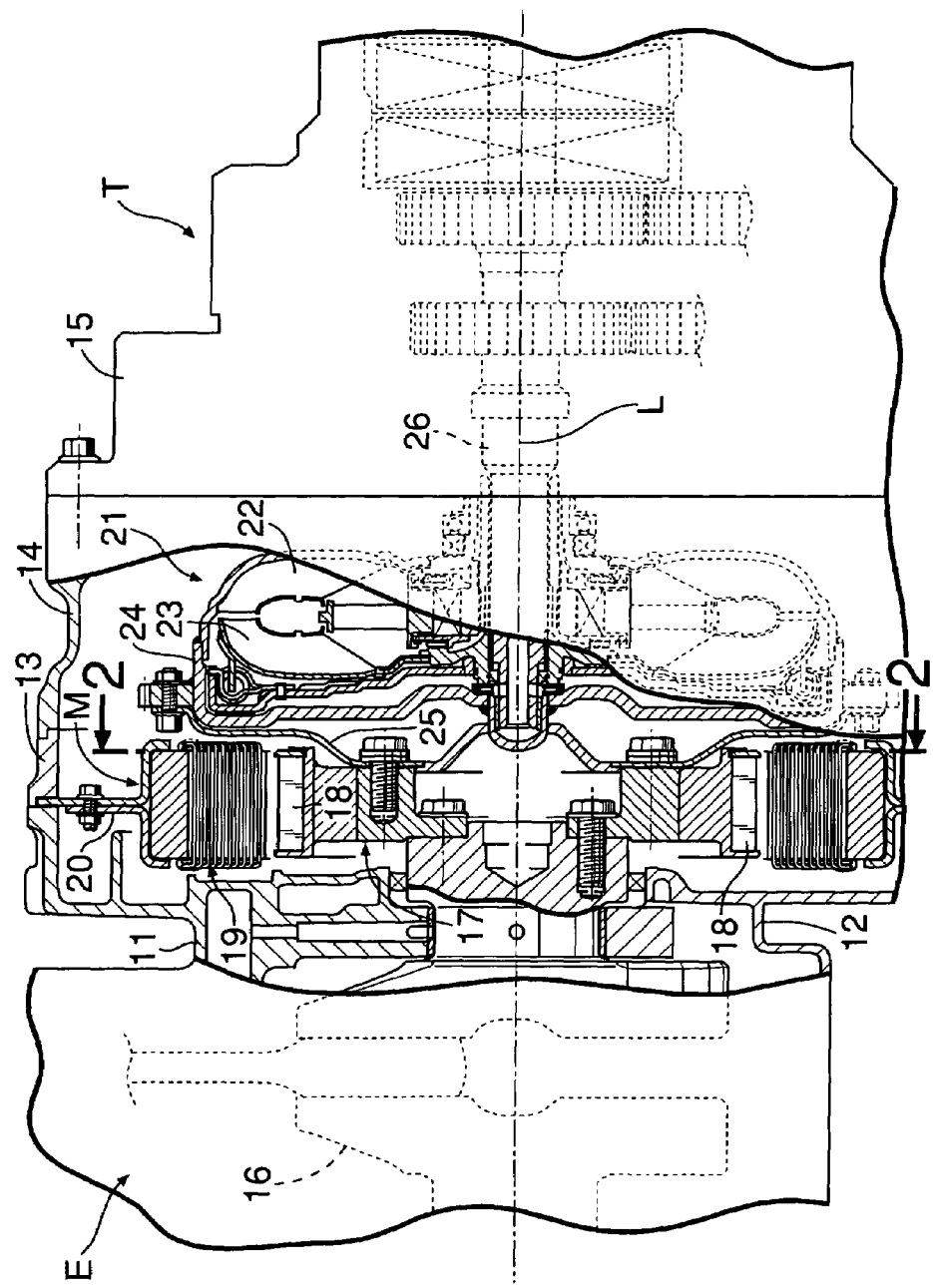
FIG. 1 is a partial cut-away diagram of a power unit for a hybrid vehicle equipped with a three-phase motor according to a preferred embodiment of the present invention.
Figure 2:
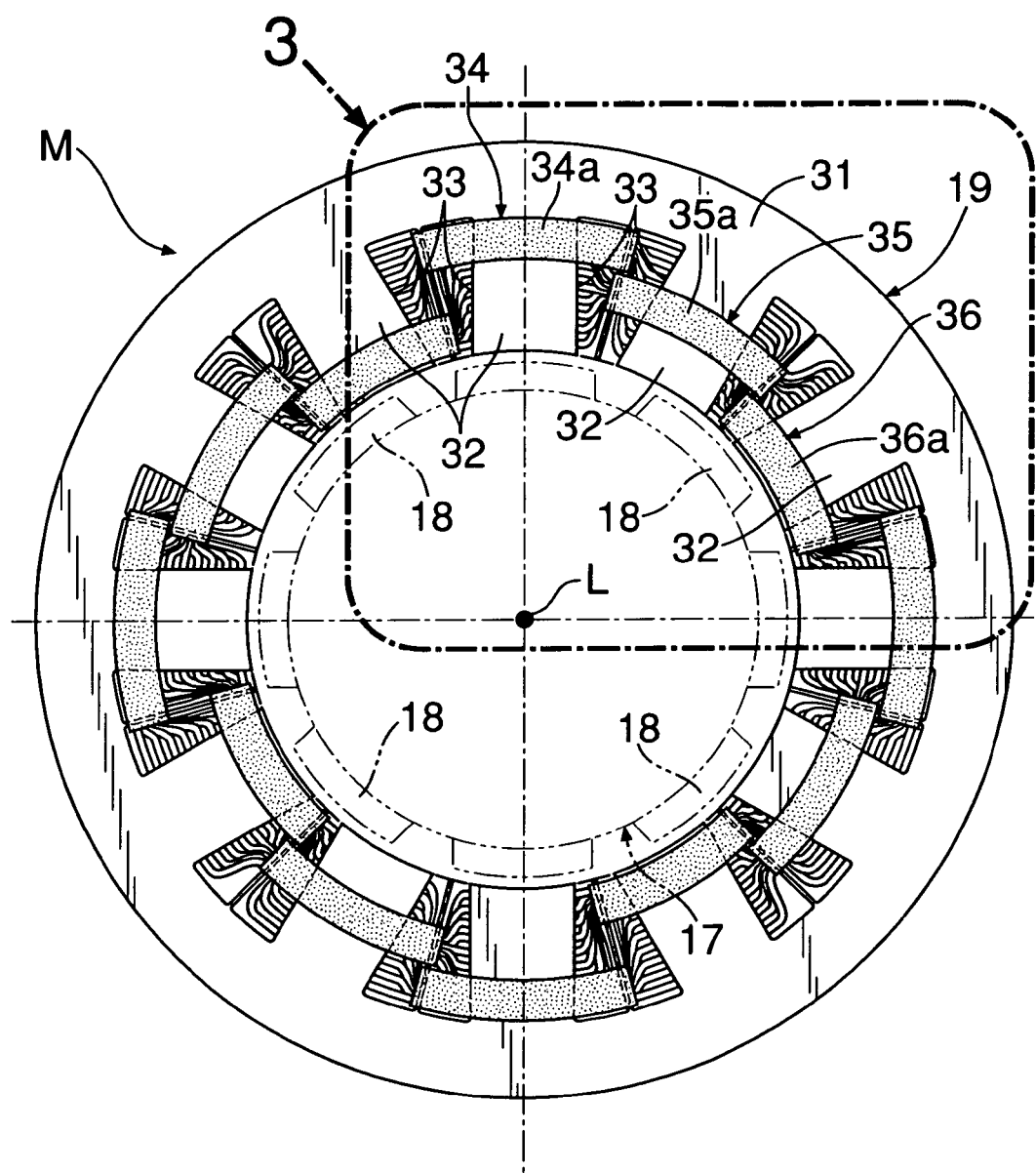
FIG. 2 is an enlarged sectional view taken along line 2-2 in FIG. 1.
Figure 3:
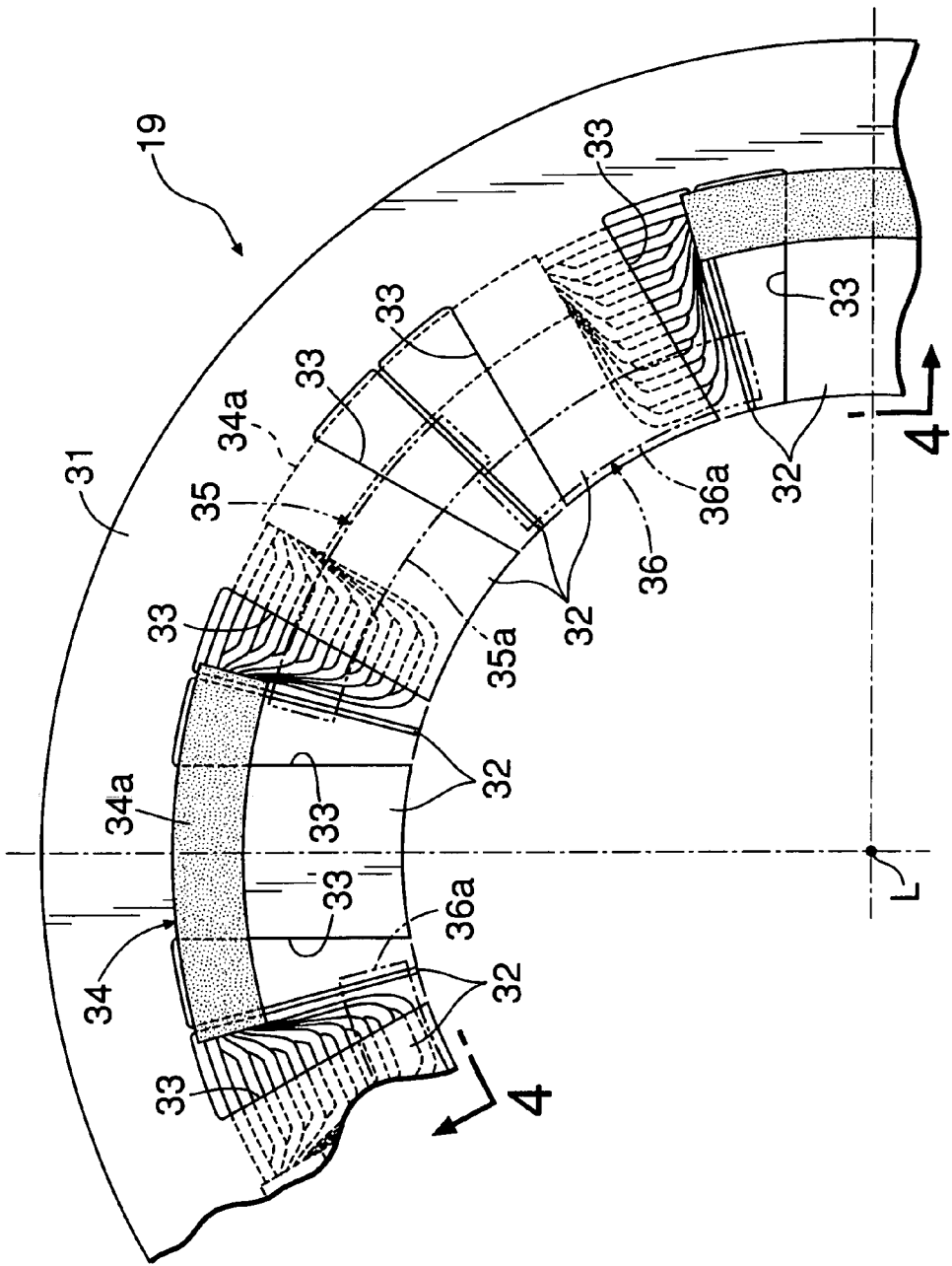
FIG. 3 is an enlarged sectional view of area 3 in FIG. 2.
Figure 4:
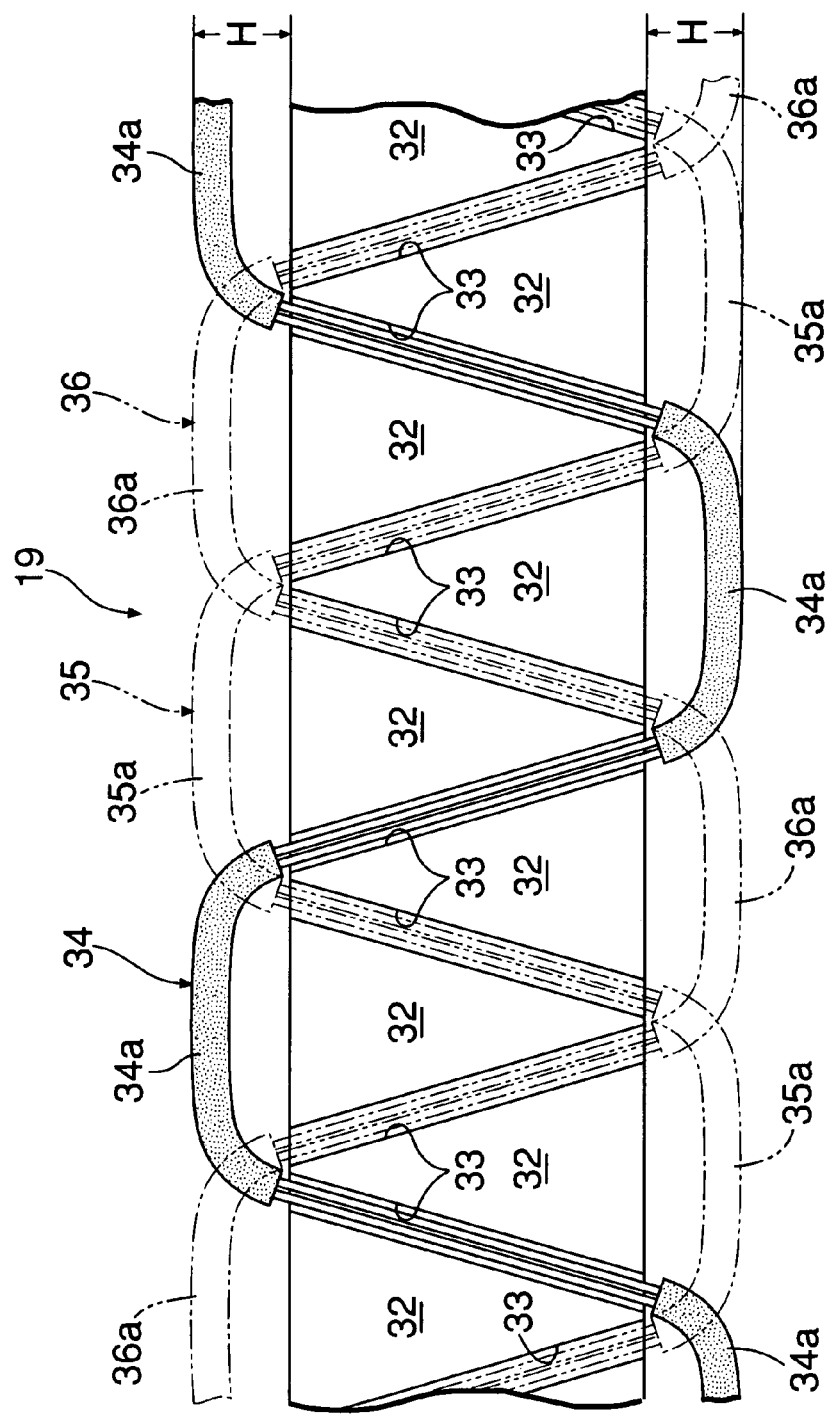
FIG. 4 is a cross-sectional view taken along line 4-4 in FIG. 3.
Figure 5:
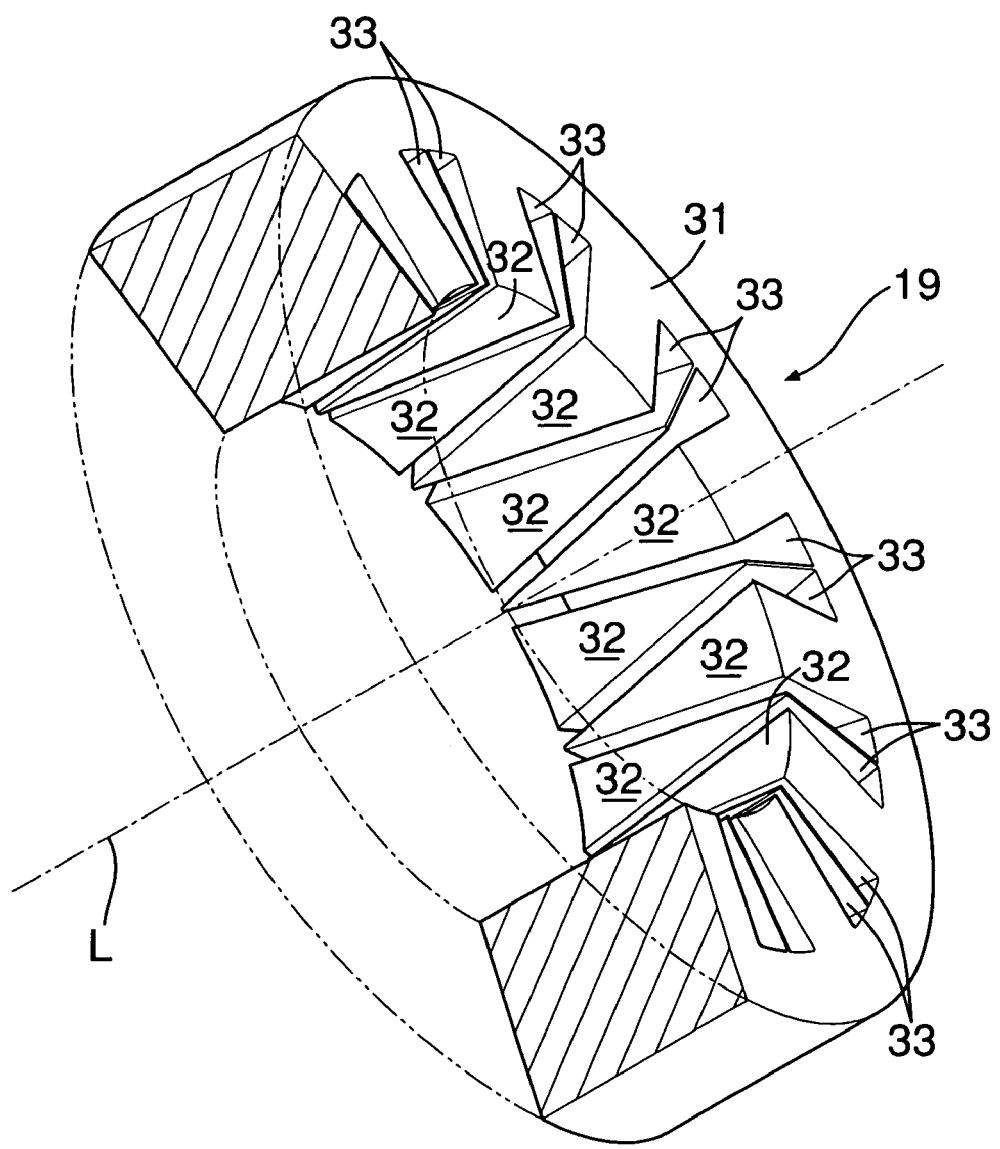
FIG. 5 is a partially cut-away perspective view of a stator core.

As shown in FIG. 1, a power unit of a hybrid vehicle is equipped with a three-phase motor M disposed between an engine E and a transmission T. A motor case 13, a torque converter case 14, and a transmission case 15 are joined to the right-hand side of a cylinder block 11 and a crankcase 12 of the engine E. A rotor 17 of the motor M is fixed to a shaft end of a crankshaft 16 supported between the cylinder block 11 and the crankcase 12. An annular stator 19 faces a plurality of permanent magnets 18 fixed to the outer periphery of the rotor 17 across a predetermined air gap. A stator holder 20 supporting the stator 19 is fixedly held between mating faces of the cylinder block 11 and the crankcase 12 and a mating face of the motor case 13.

A torque converter 21, housed in the torque converter case 14, includes a pump impeller 22 and a turbine runner 23. A side cover 24, joined to the pump impeller 22 and covering the turbine runner 23 is connected to the rotor 17 of the motor M via a drive plate 25. The turbine runner 23 of the torque converter 21 is joined to the left-hand end of a main shaft 26 supported in the transmission case 15.

The structure of the stator 19 of the motor M is now explained with reference to FIG. 2 to FIG. 7.

The stator 19 of the motor M includes an annular stator core 31, a plurality (24 in the illustrated embodiment) of teeth 32 radially projecting inward from an inner peripheral or circumferential face of the stator core 31, a U phase winding 34, a V phase winding 35, and a W phase winding 36. The U, V and W phase windings 34, 35 and 36 are wave-wound to pass through slots 33 formed between the teeth 32. The stator core 31 and the teeth 32 are integrally molded from a compacted powder.

When viewed in the radial direction, the teeth 32 have an isosceles triangle shape and taper in an axial direction L. The tapering directions of circumferentially adjacent teeth 32 oppose each other. Consequently, twelve slots 33, formed between adjacent teeth 32, are alternately skewed in opposite directions in the axial direction L. The skew angle of the slots 33 is, for example, 60°, as an electrical angle.

The U phase winding 34 is wave-wound to pass through every third slot 33 in the circumferential direction. In this process, there are two ways of winding the U phase winding 34, that is, winding in the direction shown by the solid line and in the direction shown by the broken line in FIG. 7. In order to shorten the length of the bridging portions 34a of the U phase winding 34 exposed at opposite end faces in the axial direction L of the teeth 32, the direction shown by the solid line is used.

Figure 6:
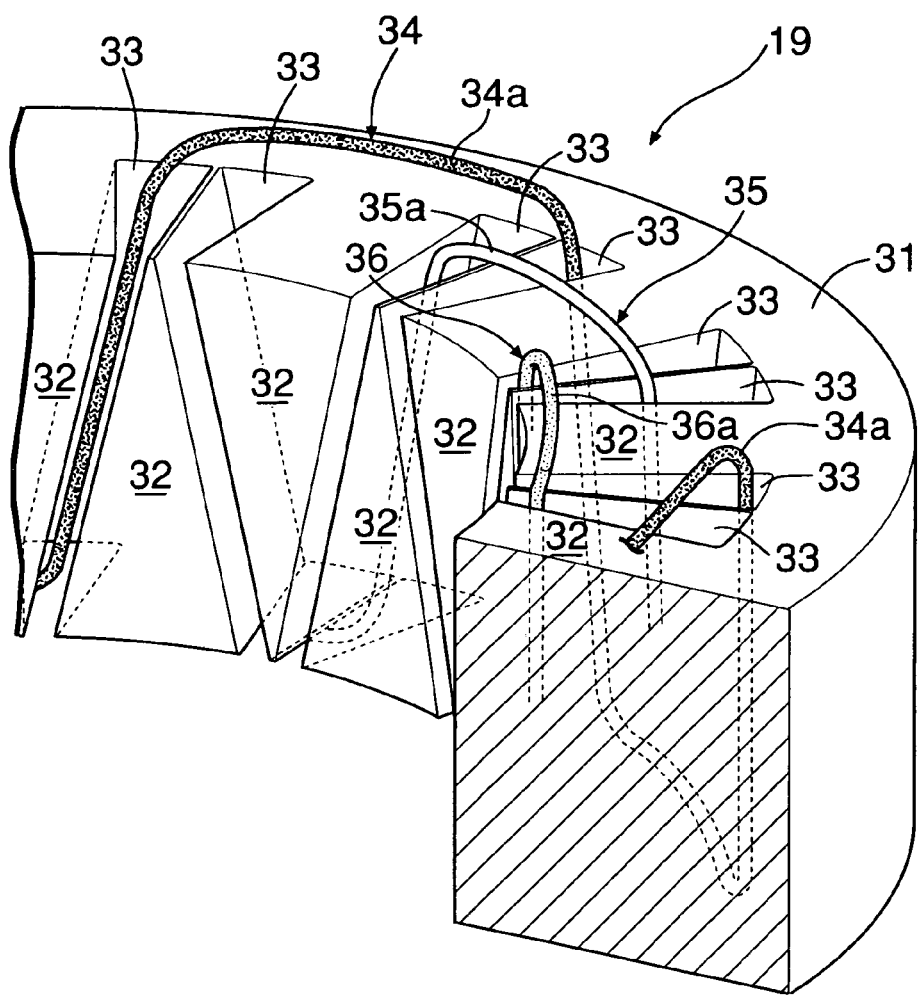
FIG. 6 is a diagram showing the relationship between slots of the stator core and a winding.

The V phase winding 35 is wave-wound to pass through the slots 33 displaced by one pitch in the circumferential direction relative to the U phase winding 34. The W phase winding 36 is wave-wound to pass through the slots 33 that are displaced by one pitch in the circumferential direction relative to the V phase winding 35. The V phase winding 35 and the W phase winding 36 are also wave-wound in directions so that the bridging portions 35a and 36a thereof are relatively short. In FIG. 6, for each of the U phase, V phase, and W phase windings 34, 35, and 36, only one of a plurality of windings is shown.

Figure 12A:
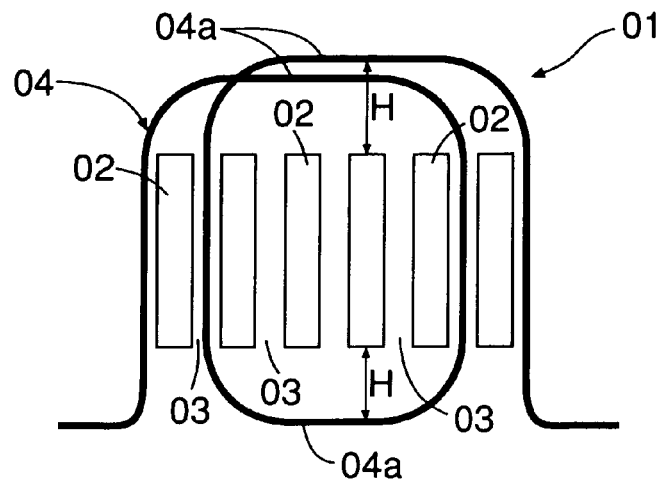
FIGS. 12A-12C explain conventional winding methods.
Figure 12B:
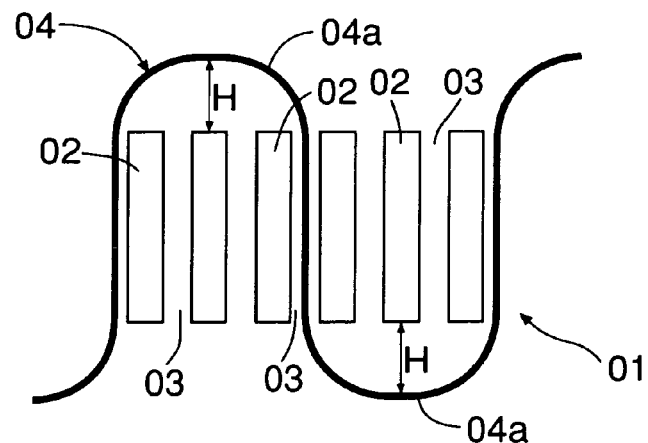
Figure 12C:
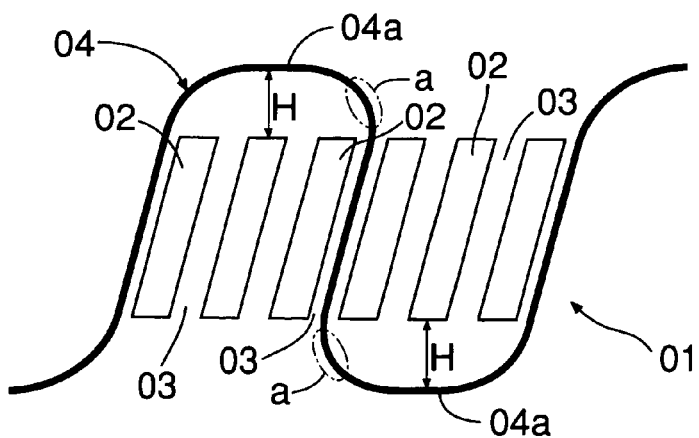

Since the slots 33 of the stator 19 are skewed in this way, it is possible to smoothly rotate the motor M by suppressing the generation of torque ripple or abnormal torque harmonics originating from, or due to, the slots 33. If all of the slots 33 are skewed in the same direction (see FIG. 12C), as in the case where the slots 33 are not skewed (see FIG. 12B), not only is it impossible to shorten the length of the bridging portions 34a, 35a, and 36a of the windings 34, 35, and 36, but it also is difficult to wind the windings 34, 35, and 36 because a certain region a at one end of each of the bridging portions 34a, 35a, and 36a bends sharply. Moreover, the projection height H in the axial direction L of the bridging portions 34a, 35a, and 36a increases, leading to a problem wherein the dimensions in the axial direction L of the stator 19 increase.

Figure 7:
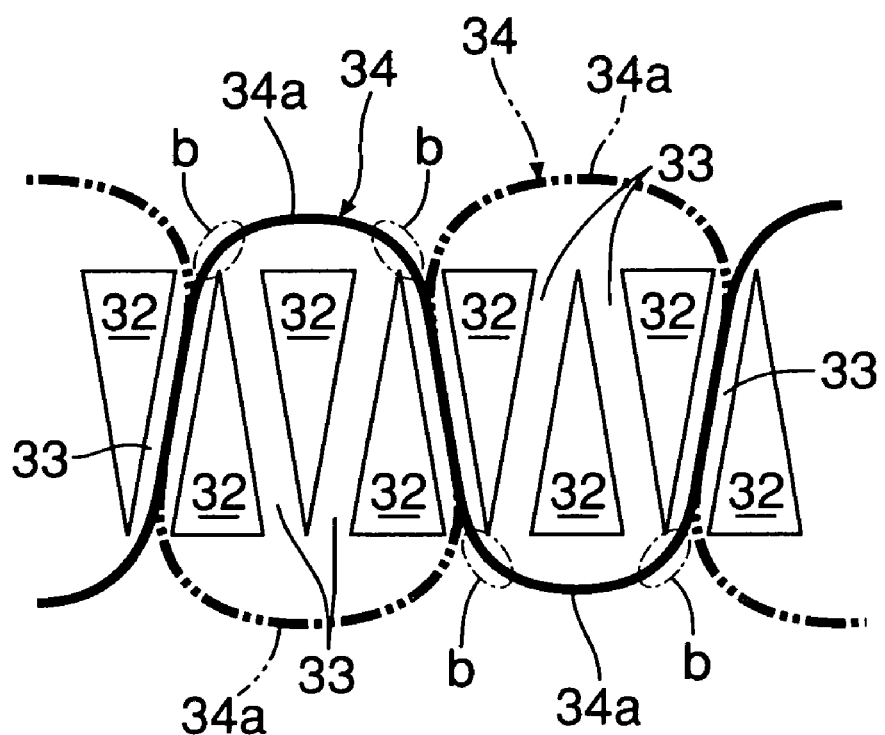
FIG. 7 is a schematic diagram corresponding to FIG. 4.

In contrast, in the present invention, as shown by the solid line in FIG. 7: the length of the bridging portions 34a, 35a, and 36a is shortened to reduce the resistance of the windings 34, 35, and 36; portions b at opposite ends of the bridging portions 34a, 35a, and 36a are obtusely bent to facilitate winding of the windings 34, 35, and 36; and the projection height H in the axial direction L of the bridging portions 34a, 35a, and 36a is decreased to reduce the dimensions in the axial direction L of the stator 19.

Although the skew factor becomes relatively small and the torque of the motor M is decreased by skewing the slots 33 of the stator 19 to suppress the occurrence of torque ripple or abnormal torque harmonics originating at, or due to, the slots 33, the decrease in torque is compensated for by a decrease in the resistance of the windings 34, 35, and 36 due to the decrease in length of the bridging portions 34a, 35a, and 36a or by an increase in the number of turns of the windings 34, 35, and 36.

Moreover, the use of a compacted powder not only enables the stator core 31, which has a complicated shape, to be easily molded, but also enables the number of components to be reduced compared with a case in which the stator core 31 is formed from laminated steel plates. Furthermore, by rounding corners of the slots 33, which are in contact with the windings 34, 35, and 36, it is possible to eliminate a protecting member, such as insulating paper, thereby further reducing the number of components and increasing the lamination factor of the windings 34, 35, and 36.

A second embodiment of the present invention is now explained with reference to FIG. 8 to FIG. 10.

Figure 8:
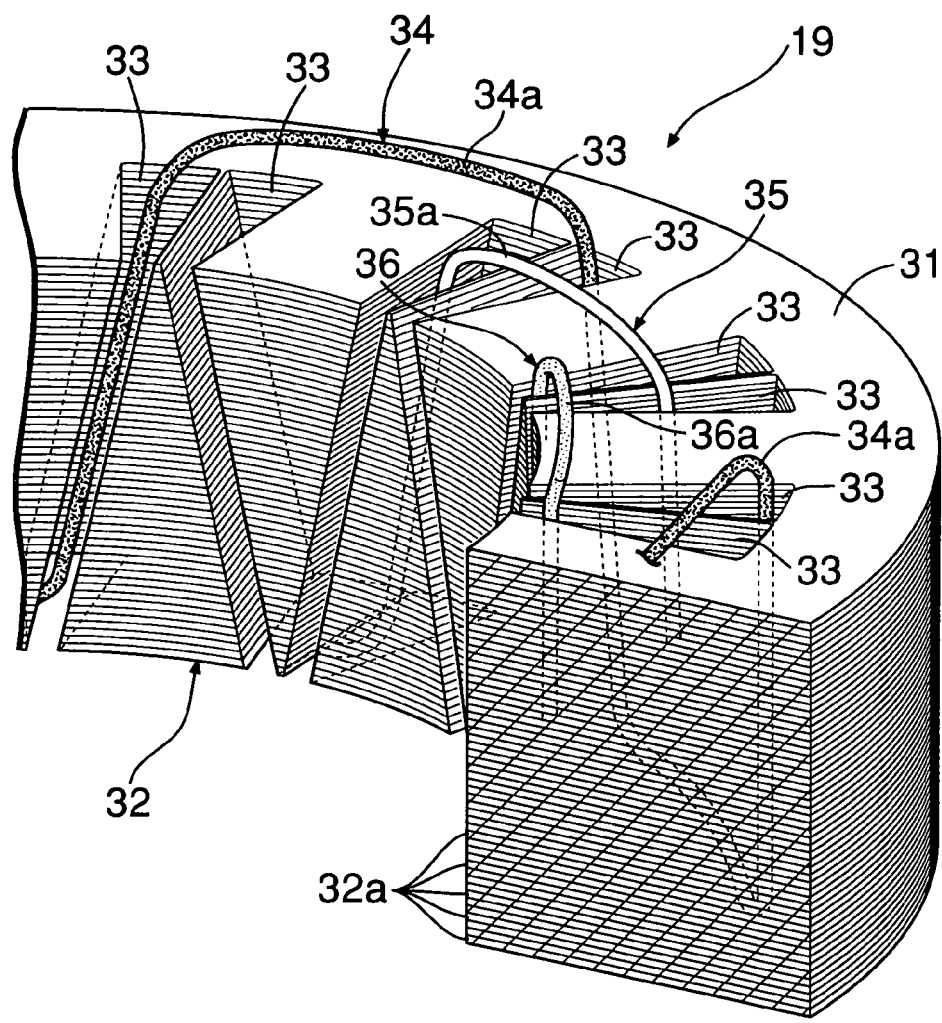
FIG. 8 is a diagram showing the relationship between slots of a stator core and winding according to another embodiment of the present invention.

As is clear from FIG. 8, a stator core 31 and teeth 32 of the second embodiment are formed from a large number of steel plates 32a laminated in an axial direction L of the stator 19. Since the direction of the slots 33 positioned between the teeth 32 is skewed relative to the axial direction L, the shape of the steel plates 32a, forming the stator core 31 and the teeth 32, varies depending on the position in the axial direction L in the stator 19.

Figure 9:
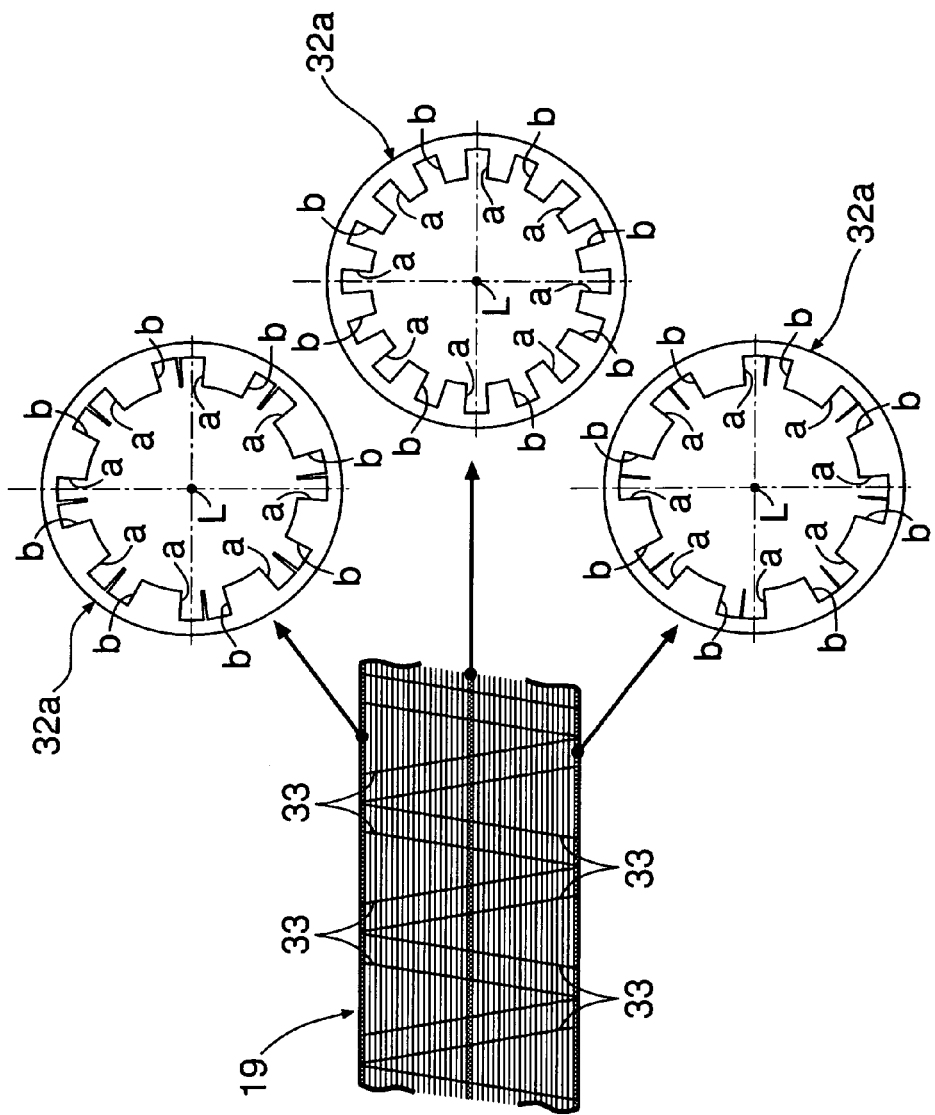
FIG. 9 is a schematic diagram used to explain the difference in shape of steel plates positioned in each section in the axial direction of the stator.

That is, as is clear from FIG. 9, each steel plate 32a includes a first cutout group formed from eight cutouts a and a second cutout group formed from eight cutouts b to correspond to sixteen slots 33. The eight cutouts a, forming the first cutout group, are arranged at equal intervals of 45° in the circumferential direction. The eight cutouts b, forming the second cutout group, are arranged at equal intervals of 45° in the circumferential direction. However, the phase between the eight cutouts a of the first cutout group and the eight cutouts b of the second cutout group varies depending on the position in the axial direction L of the steel plates 32a.

For example, in the steel plate 32a, positioned in the middle in the axial direction L of the stator 19, the eight cutouts b of the second cutout group are arranged in positions in the middle of the eight cutouts a of the first cutout group, and the sixteen cutouts a and b are arranged at equal intervals of 22.5° in the circumferential direction. In contrast, in the steel plates 32a, positioned at opposite ends in the axial direction L of the stator 19, the eight cutouts b of the second cutout group are positioned counterclockwise in the vicinity of the eight cutouts a of the first cutout group, or the eight cutouts b of the second cutout group are positioned clockwise in the vicinity of the eight cutouts a of the first cutout group, that is, the sixteen cutouts a and b are arranged unevenly in the circumferential direction.

If a large variety of steel plates 32a, having different shapes, are press-formed in this way with press dies used exclusively therefor, it is necessary to employ a large variety of press dies, leading to a problem of high cost. However, in the present invention, it is possible to mold a large variety of steel plates 32a having different shapes using one type of press die. A process for producing the steel plates 32a is explained below.

Figure 10:
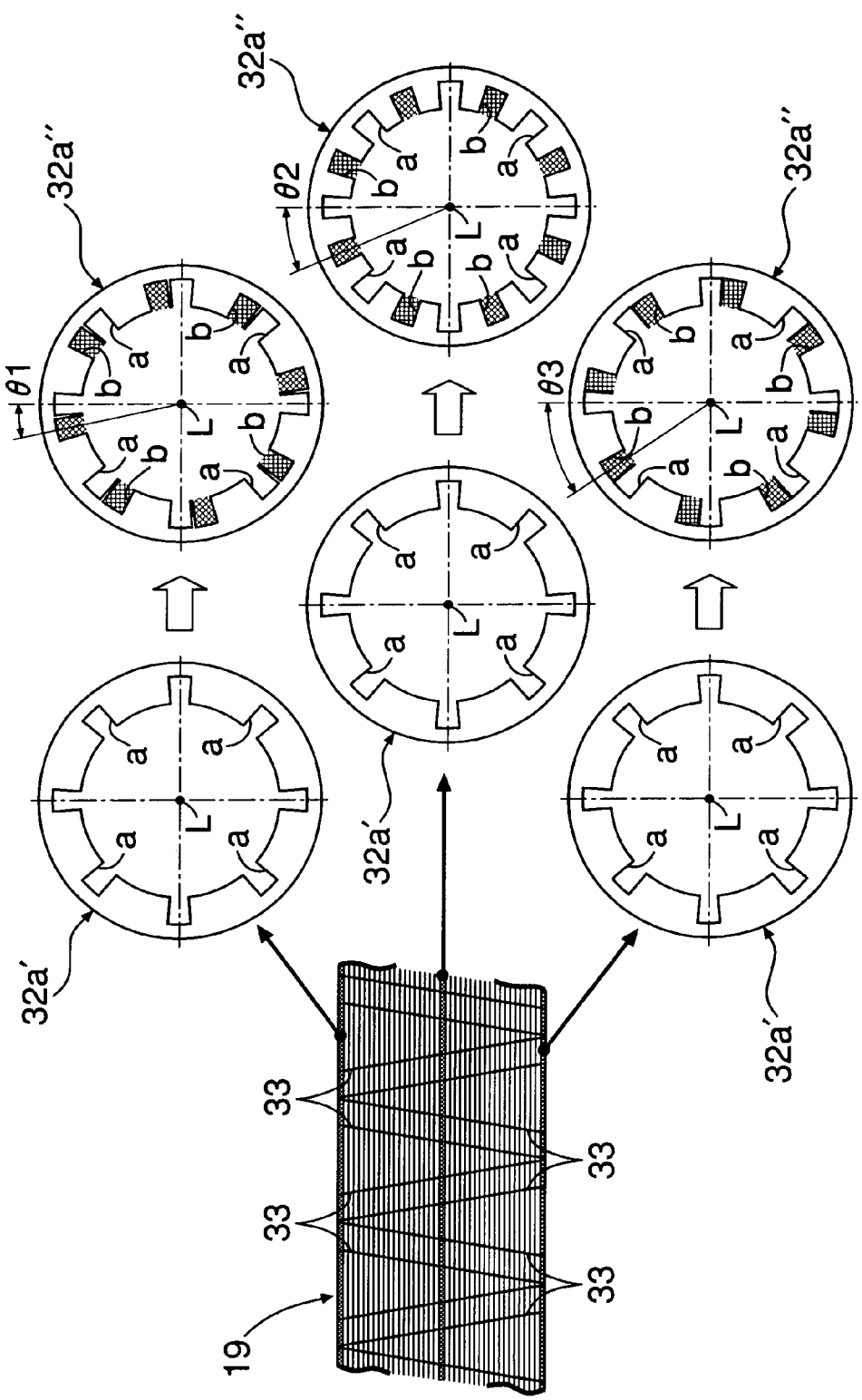
FIG. 10 is a schematic diagram used to explain a production step for a steel plate.
Figure 11:
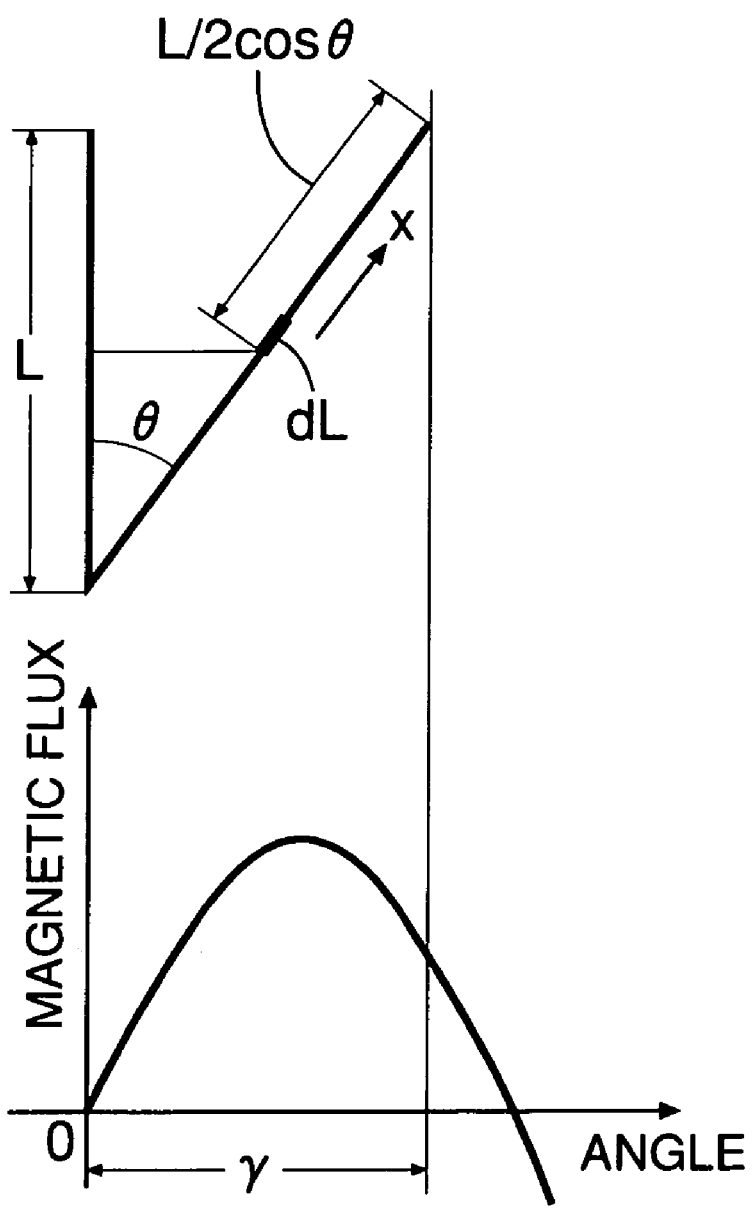
FIG. 11 is a graph explaining skew factor.

As shown in FIG. 10, a steel plate material is firstly pressed by a press die, thus punching out intermediate steel plate products 32a' having only eight cutouts a of a first cutout group (first step). It should be noted that there is only one shape of the intermediate steel plate product 32a'. Subsequently, the intermediate steel plate products 32a' are pressed (see meshed portions in FIG. 10) by using the same press die as in the first step (or a press die of the same type), thus punching out final steel plate products 32a" having the eight cutouts a of the first cutout group and eight cutouts b of a second cutout group. In this step, a phase θ between the press die and the intermediate steel plate products 32a' is changed by a predetermined amount each time according to the position in the axial direction L of the stator 19 of the final steel plate products 32a", thus giving a large variety of final steel plate products 32a" having different shapes.

When the number and width of the slots 33 of the stator 19 and the number of the steel plates 32a contained in the stator 19 are determined, the difference in phase between the eight cutouts a of the first cutout group and the eight cutouts b of the second cutout group of each steel plate 32a is accordingly determined. Therefore, by program-controlling the press die so the phase difference can be obtained, it is possible to efficiently produce a large variety of steel plates 32a having different shapes. Most importantly, since a large variety of steel plates 32a having different shapes can be produced by one (or one type of) press die, the cost is greatly reduced.

Although embodiments of the present invention have been explained above, the present invention can be modified in a variety of ways without departing from the scope and spirit of the present invention.

For example, in the embodiments, the motor M is used as a motor for travel of a hybrid vehicle, but it can be used in any application.

Further, the motor M of the embodiments is of an inner rotor type having the rotor 17 disposed within the stator 19, but the present invention is also applicable to an outer rotor type of motor having a rotor disposed on the exterior of a stator.

Furthermore, the teeth 32 of the embodiments are in the shape of an isosceles triangle when viewed radially, but they may be in the shape of an isosceles trapezoid.

Moreover, in the embodiments, a three-phase motor M is illustrated, but the present invention is also applicable to a four-or-more phase motor M.

Moreover, in the second embodiment, the first step of punching out intermediate steel plate products 32*a*' and the second step of punching out final steel plate products 32*a*'' may be carried out continuously or separately.

What is claimed is:

1. A motor stator comprising:
   an annular stator core;
   a plurality of teeth radially projecting inward from a periphery of the stator core, wherein each tooth has an arm with a tapered shape extending in an axial direction of the stator core;
   a winding wave-wound around the tapered arms of the plurality of teeth,
   wherein the winding includes a bridging portion; and
   a plurality of slots formed between arms of adjacent teeth, wherein alternating slots are skewed in opposite directions relative to each other in the axial direction of the stator core,
   wherein the winding alternately passes through slots having different skew directions, and
   wherein a length of the bridging portion is kept relatively short.

2. The motor stator according to claim 1, wherein the stator core and the teeth are formed from laminated steel plates.

3. The motor stator according to claim 1, wherein the stator core and the teeth are formed from a compacted powder.

4. A production process for the motor stator according to claim 2, the process comprising:
   a first step of forming an intermediate steel plate product having a first cutout group formed at equal intervals in the circumferential direction and from cutouts for half the plurality of slots by pressing a steel plate material using a press die; and
   a second step of forming a final steel plate product having, in addition to the first cutout group, a second cutout group formed at equal intervals in the circumferential direction and from cutouts for half the plurality of slots by pressing the intermediate steel plate product using the press die;
   wherein a phase between the press die and the intermediate steel plate product is changed during the second step according to the axial position of the final steel plate product in the stator.

5. The production process according to claim 4, wherein the phase between the press die and the intermediate steel plate product during the second step is controlled according to a program determined on the basis of the shape of the stator.

6. The motor stator according to claim 1, wherein alternating teeth are triangular in shape and extend in opposite directions in the axial direction of the stator core.

7. The motor stator according to claim 1, wherein a skew angle of each slot is constant from an axial first end of each tooth to an opposite axial second end of the corresponding tooth.

8. The motor stator according to claim 1, wherein a skew angle of each slot is 60° as an electrical angle.

9. The motor stator according to claim 1, wherein each of said teeth has an isosceles triangle in the axial direction of the stator core.

10. The motor stator according to claim 1, wherein said winding comprises a plurality of individual windings, wherein each individual winding passes through every third one of said slots in a circumferential direction of the stator core such that the slots through which each of said individual windings passes are different from those slots through which the other of said individual windings pass.

11. The motor stator according to claim 9, wherein said winding comprises a plurality of individual windings, wherein each individual winding passes through every third one of said slots in a circumferential direction of the stator core such that the slots through which each of said individual windings passes are different from those slots through which the other of said individual windings pass.

* * * * *